United States Patent
Park

(10) Patent No.: US 11,183,743 B2
(45) Date of Patent: Nov. 23, 2021

(54) BATTERY PACK

(71) Applicant: SAMSUNG SDI CO., LTD., Yongin-si (KR)

(72) Inventor: Sang Hun Park, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 77 days.

(21) Appl. No.: 16/809,872

(22) Filed: Mar. 5, 2020

(65) Prior Publication Data

US 2020/0381696 A1 Dec. 3, 2020

(30) Foreign Application Priority Data

May 31, 2019 (KR) .................. 10-2019-0064553

(51) Int. Cl.
| | | |
|---|---|---|
| *H01M 4/02* | (2006.01) | |
| *H01M 50/572* | (2021.01) | |
| *B23K 26/21* | (2014.01) | |
| *H01M 10/42* | (2006.01) | |
| *H01M 50/169* | (2021.01) | |
| *H01M 50/538* | (2021.01) | |

(52) U.S. Cl.
CPC .......... *H01M 50/572* (2021.01); *B23K 26/21* (2015.10); *H01M 10/425* (2013.01); *H01M 50/169* (2021.01); *H01M 50/538* (2021.01)

(58) Field of Classification Search
CPC ...................................................... H01M 4/02
See application file for complete search history.

(56) References Cited

U.S. PATENT DOCUMENTS

| | | |
|---|---|---|
| 2008/0217307 A1 | 9/2008 | Dauvel et al. |
| 2014/0037994 A1* | 2/2014 | Lee .................. C23C 18/1651 429/7 |
| 2015/0147599 A1 | 5/2015 | Lee et al. |

FOREIGN PATENT DOCUMENTS

| | | |
|---|---|---|
| EP | 2328211 A1 | 6/2011 |
| JP | 2003-077451 A | 3/2003 |
| JP | 2003-170290 A | 6/2003 |
| JP | 2008-068316 A | 3/2008 |
| KR | 10-2008-0003853 A | 1/2008 |
| KR | 10-2018-0031975 A | 3/2018 |

OTHER PUBLICATIONS

Extended European Search Report dated Sep. 10, 2020.

* cited by examiner

*Primary Examiner* — Jacob B Marks

(74) *Attorney, Agent, or Firm* — Lee IP Law, P.C.

(57) ABSTRACT

A battery pack including a protective circuit module including a circuit board extending in a first direction, an electrode tab coupling part on the circuit board, and a protection layer between the electrode tab coupling part and the circuit board; and a battery cell including an electrode tab protruding at one end and having a polarity, the electrode tab being coupled to a top surface of the electrode tab coupling part, wherein the electrode tab of the battery cell, the electrode tab coupling part, and the protection layer of the protective circuit module are stacked and coupled in a second direction perpendicular to the first direction.

9 Claims, 7 Drawing Sheets

BATTERY PACK

CROSS-REFERENCE TO RELATED APPLICATION

Korean Patent Application No. 10-2019-0064553, filed on May 31, 2019, in the Korean Intellectual Property Office, and entitled: "Battery Pack," is incorporated by reference herein in its entirety.

BACKGROUND

1. Field

Embodiments relate to a battery pack.

2. Description of the Related Art

An electronic device, such as a notebook computer, a mini notebook computer, a net book, a mobile computer, an ultramobile personal computer (UMPC) or a portable multimedia player (PMP), uses a battery pack as a portable power source, and the battery pack may have a plurality of battery cells connected in series and/or in parallel. The battery pack may include a protective circuit module (PCM) for protecting battery cells against over-charge, over-discharge, and/or over-current. The battery cells and the PCM may be housed together in a case.

SUMMARY

The embodiments may be realized by providing a battery pack including a protective circuit module including a circuit board extending in a first direction, an electrode tab coupling part on the circuit board, and a protection layer between the electrode tab coupling part and the circuit board; and a battery cell including an electrode tab protruding at one end and having a polarity, the electrode tab being coupled to a top surface of the electrode tab coupling part, wherein the electrode tab of the battery cell, the electrode tab coupling part, and the protection layer of the protective circuit module are stacked and coupled in a second direction perpendicular to the first direction.

The protective circuit module may further include a solder coupling the electrode tab coupling part to the circuit board, and the protection layer may have a same height as the solder in the second direction.

The electrode tab of the battery cell and the electrode tab coupling part of the protective circuit module may be coupled to each other by welding.

The protection layer may include gold, aluminum, iron, platinum, molybdenum, tantalum, chromium, or an alloy thereof.

The protection layer may include a first layer positioned between the electrode tab coupling part and the circuit board, and a second layer extending from the first layer along a surface of the circuit board in the first direction.

A surface of the second layer may include a thermocolor ink, a silk ink, or a photo solder resist ink.

The second layer may be exposed on the circuit board.

The second layer may extend a distance of 2 mm or less outwardly from under the electrode tab coupling part.

The protection layer may have an area corresponding to at least the electrode tab.

BRIEF DESCRIPTION OF DRAWINGS

Features will be apparent to those of skill in the art by describing in detail exemplary embodiments with reference to the attached drawings in which.

DETAILED DESCRIPTION

Figure 1:
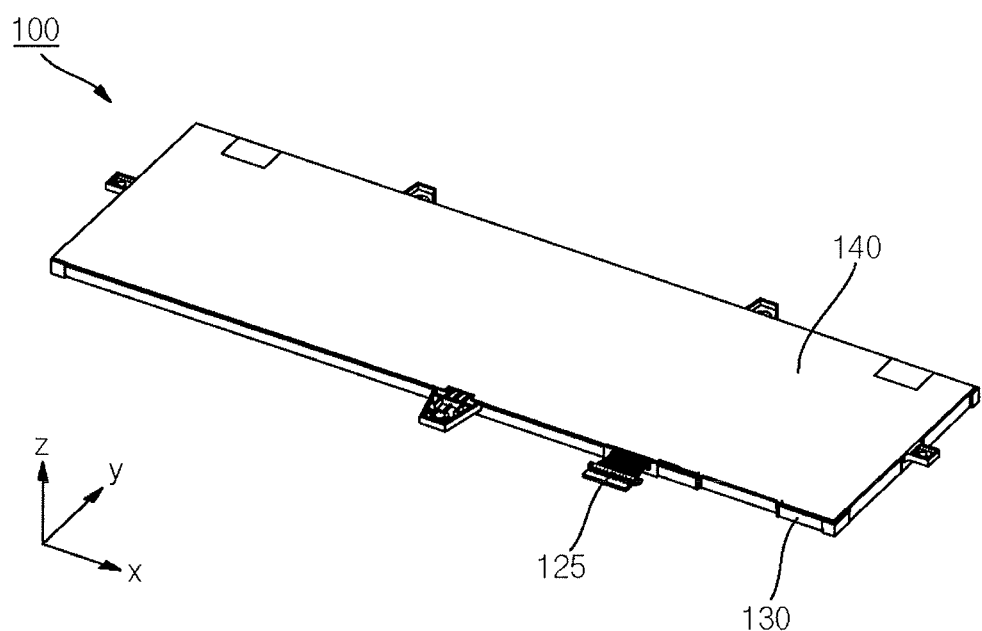
FIG. 1 illustrates a perspective view of a battery pack according to an embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" include any and all combinations of one or more of the associated listed items. In addition, it will be understood that when an element A is referred to as being "connected to" or "coupled to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise or include" and/or "comprise," and/or "comprising," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 2:
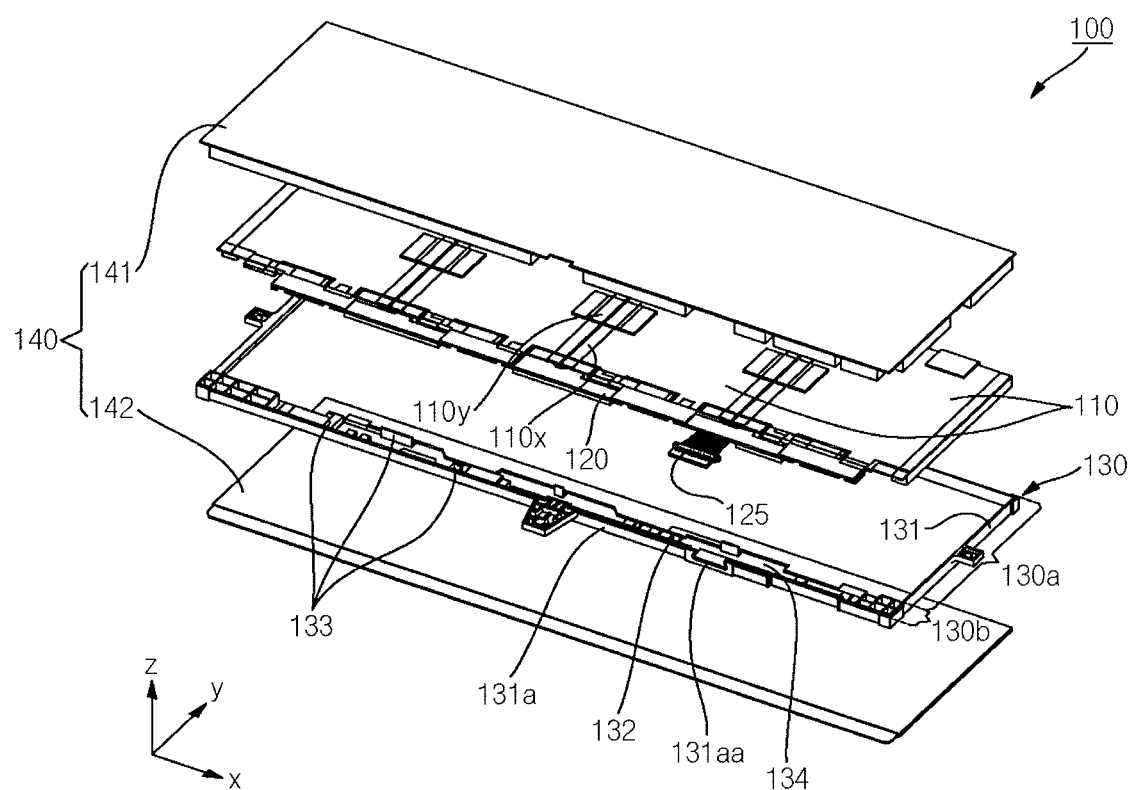
FIG. 2 illustrates an exploded perspective view of the battery pack shown in FIG. 1.

FIG. 1 illustrates a perspective view of a battery pack according to an embodiment of the present disclosure. FIG. 2 illustrates an exploded perspective view of the battery pack of FIG. 1.

As shown in FIGS. 1 and 2, the battery pack 100 according to an embodiment may include battery cells 110, a protective circuit module 120 electrically connected to the battery cells 110, a frame 130 accommodating the battery cells 110 and the protective circuit module 120 together, and a cover 140 covering the battery cells 110, the protective circuit module 120, and the frame 130.

Figure 3:
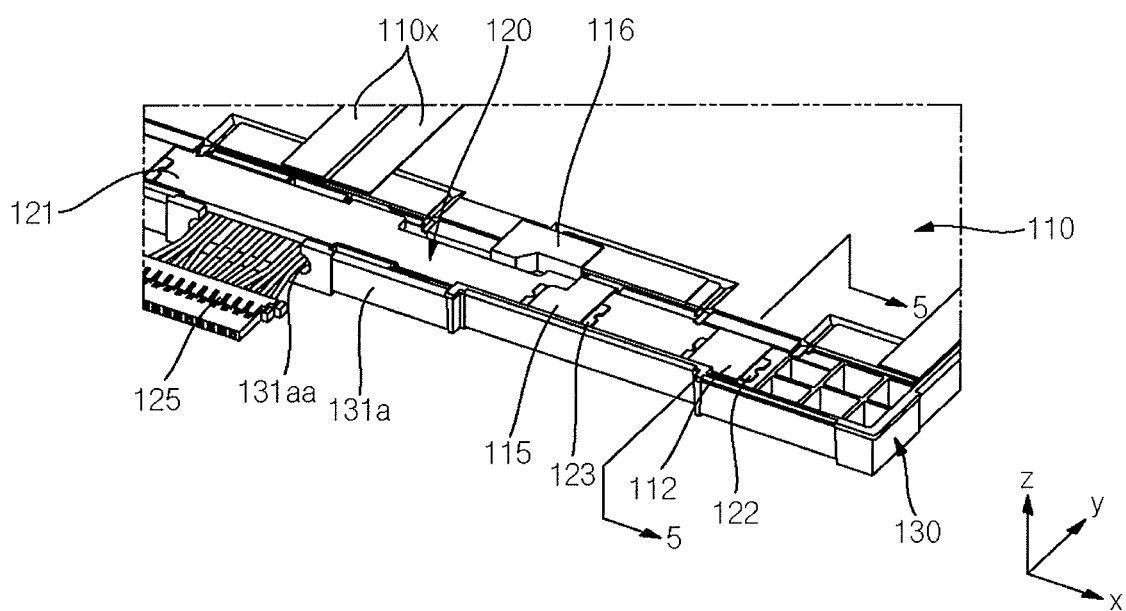
FIG. 3 illustrates an enlarged perspective view of a state in which battery cells, a protective circuit module, and a frame are coupled to one another in the battery pack of FIG. 1.
Figure 4:
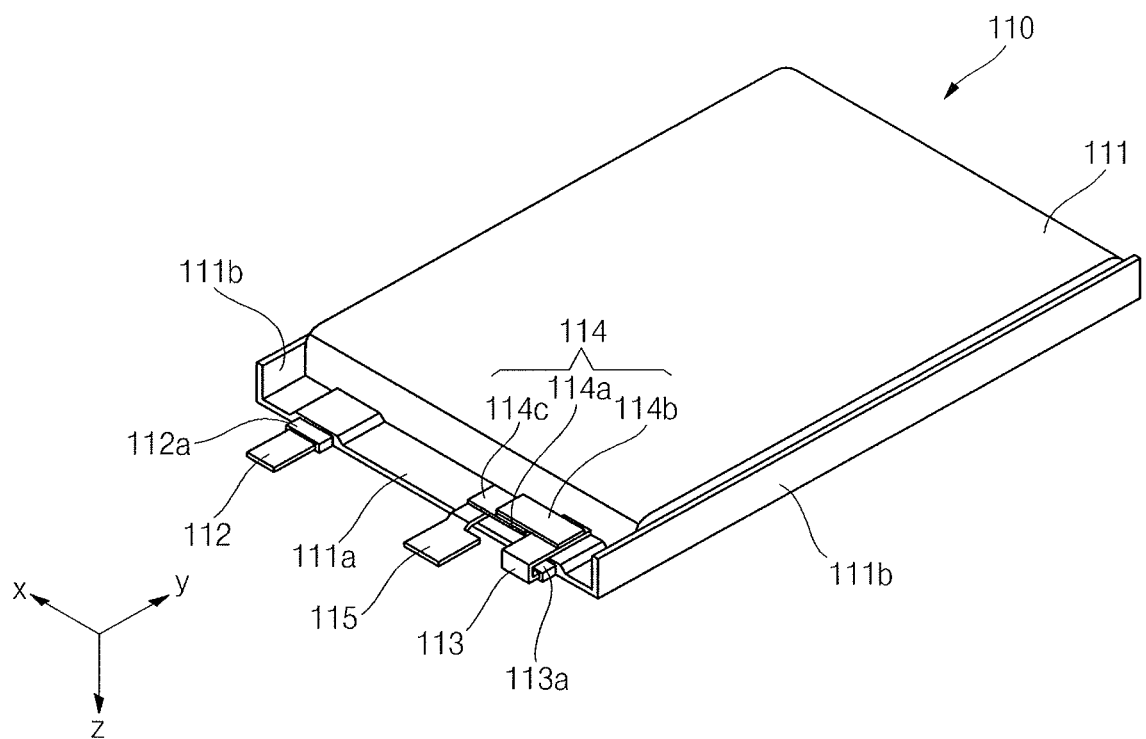
FIG. 4 illustrates an enlarged perspective view of a battery cell of FIG. 2.

FIG. 3 illustrates an enlarged perspective view of a state in which battery cells, the protective circuit module, and the frame are coupled to one another in the battery pack of FIG. 1. FIG. 4 illustrates an enlarged perspective view of a battery cell of FIG. 2. Hereinafter, a configuration of the battery pack shown in FIGS. 1 and 2 will be described with reference to FIGS. 3 and 4.

Each of the battery cells 110 may be configured such that an electrode assembly and an electrolyte are accommodated in a case 111. The electrode assembly may be fabricated by stacking a stacked structure having a separator between a positive electrode plate and a negative electrode plate or winding the stacked structure in a jelly-roll configuration. The electrode assembly may be sealed after being accommodated in the case 111 with the electrolyte. The thus configured battery cell 110 may be a pouch-type secondary battery having the electrode assembly accommodated in the pouch-type case 111. The battery cell 110 may include a first electrode tab 112 (protruding from a front surface of the battery cell 110 in a Y direction and electrically connected to the negative electrode plate of the electrode assembly) and a second electrode tab 113 (spaced a predetermined distance apart from the first electrode tab 112 in an X direction that is orthogonal to the Y direction, outwardly protruding from the front surface of the battery cell 110 in the Y direction, and electrically connected to the positive electrode plate of the electrode assembly). In an implementation, the first electrode tab 112 may be a first tab, and the second electrode tab 113 may be a second tab. In an implementation, the polarities of the first electrode tab 112 and the second electrode tab 113 may be reversed.

The battery cell 110 may have the first electrode tab 112 and the second electrode tab 113 outwardly extending and protruding through a flat or planar portion 111a of the case 111.

The case 111 may include an upper pouch and a lower pouch, which may be prepared by folding a rectangular pouch film in a lateral X direction. In addition, the case 111 may include the planar portion 111a and a welding portion 111b, which may be created by fusing and bonding the upper pouch and the lower pouch.

The welding portions 111b may mean portions extending a predetermined length in the X direction from opposite sides of the case 111 and bent toward the upper pouch to then be adhered and fixed to the sides of the case 111.

The planar portion 111a may mean a planarly extending portion that outwardly extends in a back-and-forth direction Y of the battery cell 110. In addition, the planar portion 111a may be a portion from which the second electrode tab 113 and the first electrode tab 112 protrude. In addition, insulation tapes 112a and 113a may be provided to facilitate insulation between the case 111 and the second electrode tab 113 and between the case 111 and the first electrode tab 112, respectively.

The battery cell 110 may have the second electrode tab 113 bent twice upward and toward the planar portion 111a so as to be parallel with the planar portion 111a. In addition, an end of the second electrode tab 113 parallel with the planar portion 111a may be electrically connected to a temperature sensing element 114. For example, the temperature sensing element 114 may be on the planar portion 111a. In an implementation, the temperature sensing element 114 may include, e.g., a temperature cut-off element (TCO) 114a, and a first tab 114b, and a second tab 114c electrically connected to opposite sides of the TCO 114a. For example, when a temperature of the battery cell 110 exceeds a reference value, the TCO 114a may operate as a fuse that cuts off current. The temperature sensing element 114 may have the first tab 114b in contact with and coupled to the second electrode tab 113 and the second tab 114c in contact with and coupled to a lead plate 115 that is a metal plate. For example, the first tab 114b and the second tab 114c may be a metal or an equivalent thereof. For example, the temperature sensing element 114 may be electrically connected between the second electrode tab 113 and the lead plate 115.

In an implementation, the temperature sensing element 114 may be connected to the battery cell 110. In an implementation, the temperature sensing element 114 may be in the protective circuit module 120. For example, the second electrode tab 113 and the first electrode tab 112 of the battery cell 110 may be electrically connected to the protective circuit module 120, respectively.

The lead plate 115 may extend outwardly from the planar portion 111a in the Y direction to then be substantially parallel with the first electrode tab 112. The lead plate 115 may be made of a metal or an equivalent thereof. The lead plate 115 may be electrically connected to the second electrode tab 113 through the temperature sensing element 114. In an implementation, the temperature sensing element 114 and the second electrode tab 113 may be covered by an insulation tape 116 with the planar portion 111a, thereby being fixed and electrically protected. In an implementation, the lead plate 115 and the first electrode tab 112 may be welded to the protective circuit module 120 to then be electrically connected to the protective circuit module 120.

In the following description, for the sake of convenient explanation, the first electrode tab 112 and the lead plate 115 will be referred to as both electrode tabs 112 and 115 of the battery cell 110.

In addition, the battery cell 110 shown in FIG. 4 may be inverted such that the temperature sensing element 114 is positioned under the planar portion 111a, to then be received in the frame 130. The battery cell 110 may be mounted in a cell mount portion 130a of the frame 130.

The battery cell 110 may include a plurality of battery cells 110 mounted in the frame 130 such that side surfaces of adjacent ones of the battery cells 110 are positioned to face each other. For example, the welding portions 111b may be fixed to sides of the battery cell 110 using a tape 110x, and the battery cell 110 can be easily inserted into or removed from the frame 130. In addition, after the battery cell 110 are mounted in the frame 130, the battery cell 110 may have sides adhered to top surfaces of adjacent ones of the battery cells 110 so as to facilitate handling, to then be coupled and fixed. Here, opposite side surfaces of each of the battery cells 110 are surfaces fixed at the welding portions 111b using the tape 110x and extending lengthwise in the Y direction. In an implementation, four battery cells 110 may be arranged such that side surfaces of two of the four battery cells 120 face each other, as shown in FIG. 2. The plurality of battery cells 110 may be positioned sequentially side-by-side in the X direction. For example, one of the battery cells 110 may be positioned such that its side surfaces face its adjacent battery cells 110.

The protective circuit module 120 may be mounted in a module mount portion 130b of the frame 130. The module mount portion 130b may be between a front wall 131a and the cell mount portion 130a in the frame 130 (e.g., in the Y direction). The protective circuit module 120 may be mounted in a module support portion 133 in the module mount portion 130b. In an implementation, the protective circuit module 120, which may have a plate shape extending lengthwise in the X direction along the front wall 131a of the frame 130, may be between the front wall 131a of the frame 130 and the battery cell 110 and may have a predetermined width in the Y direction. In an implementation, the battery cells 110 may be at the rear of the protective circuit module 120.

The protective circuit module 120 may include the plate-shaped circuit board 121 having a plurality of wire patterns. The plate-shaped circuit board 121 may extend lengthwise in the X direction along the front wall 131a of the frame 130. In an implementation, the circuit board 121 may further include a plurality of protection devices electrically connected to the plurality of wire patterns. In an implementation, the protective circuit module 120 may further include electrode tab coupling portions 122 and 123 connected to the opposite-side electrode tabs 112 and 115 of the battery cells 110. The electrode tab coupling portions 122 and 123 may be electrically connected to the wire patterns in the circuit board 121. In an implementation, the electrode tab coupling portions 122 and 123 may electrically connect (in series or in parallel) each of the plurality of battery cells 110 by the wire patterns provided in the circuit board 121.

In an implementation, the circuit board 121 may be electrically connected to a connector 125 that protrudes to be outwardly exposed on the battery pack 100. The protective circuit module 120 may be electrically connected to the exterior (e.g., to a device to be powered or to a charger) through the connector 125 and may control charge and discharge operations of the battery cells 110.

The electrode tab coupling portions 122 and 123 (electrically connected to the battery cells 110) may be on the top surface of the circuit board 121. The electrode tab coupling portions 122 and 123 may include a first electrode tab coupling portion 122 and a second electrode tab coupling portion 123. The circuit board 121 may include a plurality of electrode tab coupling portions 122 and 123 electrically connected to the plurality of battery cells 110, respectively. In addition, the plurality of electrode tab coupling portions 122 and 123 may be spaced apart from one another in the X direction. In addition, the plurality of electrode tab coupling portions 122 and 123 may be positioned to correspond to or be aligned with the opposite-side electrode tabs 112 and 115 of the battery cells 110.

For example, the first electrode tab connector portion 122 may be electrically connected to the first electrode tab 112 of the battery cell 110 by laser beam welding, and the second electrode tab connector portion 123 may be electrically connected to the lead plate 115 of the battery cell 110 by laser beam welding. Such welding will now be described in detail.

The frame 130 may define assembled positions of the battery cells 110 and the protective circuit module 120. The frame 130 may be made of an insulating material, e.g., a polymer compound molded by heat or pressure. The frame 130 may enclose the battery cells 110 and the protective circuit module 120 within the frame 130 and may include outer walls 131 shaped of a rectangular ring extending in an up-and-down, e.g., vertical, Z direction, which is a thickness direction of the frame 130.

The frame 130 may include the module mount portion 130b at a region adjacent to the front wall 131a among four outer walls 131 and cell mount portion 130a at a rear of the module mount portion 130b. In the frame 130, the cell mount portion 130a and the module mount portion 130b may be within a region enclosed by the outer walls 131. The front wall 131a may be a surface having a connector hole 131aa allowing the connector 125 of the protective circuit module 120 to be outwardly exposed and protruded.

For example, both of a top surface and a bottom surface of the frame 130 may be open at the cell mount portion 130a. In addition, the frame 130 may have a bottom surface 134 at the module mount portion 130b. For example, the bottom surface 134 may be provided at a region of the frame 130 adjacent to the front wall 131a. In addition, the module support portion 133 (upwardly protruding to support the protective circuit module 120) may be on the bottom surface 134 of the module mount portion 130b of the frame 130.

The frame 130 may have the bottom surface 134 at the module mount portion 130b, which is a region of or near the front wall 131a. In addition, the module support portion 133 in the module mount portion 130b may contact a facing, e.g., bottom, surface of the circuit board 121. For example, the module support portion 133 may have a height (in the Z direction) smaller than that of the outer walls 131 of the frame 130. The module support portion 133 may include a plurality of module support portions at a plurality of locations of the module mount portion 130b to support the protective circuit module 120 at a plurality of locations so as to be securely mounted. In an implementation, the module support portion 133 may further include a rib 132 supporting the circuit board 121 (e.g., in contact with the bottom surface of the circuit board 121 at a region adjacent to a board throughhole of the circuit board 121. The rib 132 may withstand a pressure applied when the battery cell 110 and the protective circuit module 120 are welded.

The cover 140 may cover the top and bottom surfaces of the frame 130 (having the battery cells 110 and the protective circuit module 120 mounted thereon or therein). The cover 140 may include an upper cover 141 and a lower cover 142. The upper cover 141 may be coupled to the frame 130 from above so as to cover the top surface of the battery cell 110 and the top surface of the protective circuit module 120. The lower cover 142 may be coupled to the frame 130 from below so as to cover the bottom surface of the battery cell 110 and the bottom surface 134 of the frame 130. The battery cell 110 and the protective circuit module 120 may be accommodated inside the frame 130 and the cover 140. The cover 140 may provide protection for the battery cell 110 and the protective circuit module 120 from external elements and/or environmental exposure.

Figure 5:
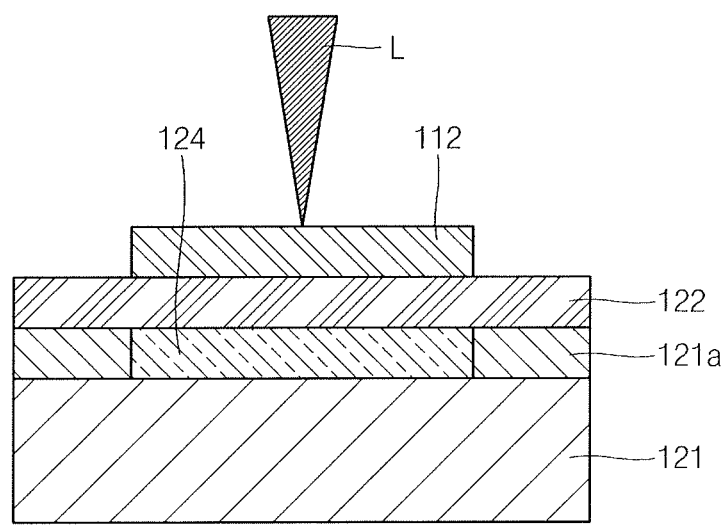
FIG. 5 illustrates a cross-sectional view taken along the line 5-5 of FIG. 3.

FIG. 5 illustrates a cross-sectional view taken along the line 5-5 of FIG. 3. For brevity, the frame 130 under the protective circuit module 120 is not shown in FIG. 5. In an implementation, as described above, the circuit board 121 may be welded to the battery cells 110 in a state in which the battery cells 110 are mounted in the frame 130. For example, the rib 132 under the frame 130 may support a bottom portion of the circuit board 121.

The protective circuit module 120 may be fixed with or to the first electrode tab connector portion 122 on the circuit board 121 using a conductive adhesion member 121a. In an implementation, the conductive adhesion member 121a may be prepared using, e.g., a general solder. The conductive adhesion member 121a may be provided along edges of a bottom surface, e.g., except for a central region, of the first electrode tab connector portion 122. For example, a space may be present between the central region of the first electrode tab connector portion 122 and the circuit board 121. A protection layer 124 may be in the space. For example, the protection layer 124 may have an area corresponding to (e.g., a size and shape similar to and aligned with) the first electrode tab 112 on the first electrode tab connector portion 122. For example, irrespective of places of the first electrode tab 112, into which laser beam L is irradiated, the first electrode tab 112 may be covered by or aligned with the protection layer 124 when performing welding for coupling the first electrode tab 112 to the first electrode tab connector portion 122 of the circuit board 121. During laser beam welding, the laser beam L could penetrate a material to be welded to then reach the circuit board positioned under the material, potentially causing a damage to the circuit board. In the battery pack 100 according to the embodiment, even when the laser beam L for welding the first electrode tab 112 with the first electrode tab connector portion 122 penetrates into or through the first electrode tab connector portion 122, the underlying protection layer 124 may help block the laser beam L, thereby preventing the circuit board 121 from being damaged by the laser beam L.

The first electrode tab connector portion 122 may have a larger area than the first electrode tab 112. For example, the first electrode tab connector portion 122 may extend beyond outer edges of the first electrode tab 112 on the circuit board 121 to then be exposed. For example, when the first electrode tab 112 is mounted on the first electrode tab connector portion 122 and welding is then performed, it may be visually inspected whether welding is being conducted on an accurate position.

In an implementation, the protection layer 124 may include, e.g., gold, aluminum, iron, platinum, molybdenum, tantalum, chromium, or an alloy thereof, which can be fabricated as a thin film.

In an implementation, the protection layer 124 may be under a portion where the first electrode tab 112 and the first electrode tab coupling portion 122 are coupled to each other. In an implementation, protection layers may also be on the lead plate 115 connected to the second electrode tab 113 and under a portion where the second electrode tab 113 and the second electrode tab coupling part 123 are coupled to each other. In an implementation, the additional protection layers may include the same material as the protection layer 124 under the first electrode tab 112, or may include a different material from the protection layer 124.

Hereinafter, a configuration of a battery pack according to another embodiment of the present disclosure will be described.

Figure 6:
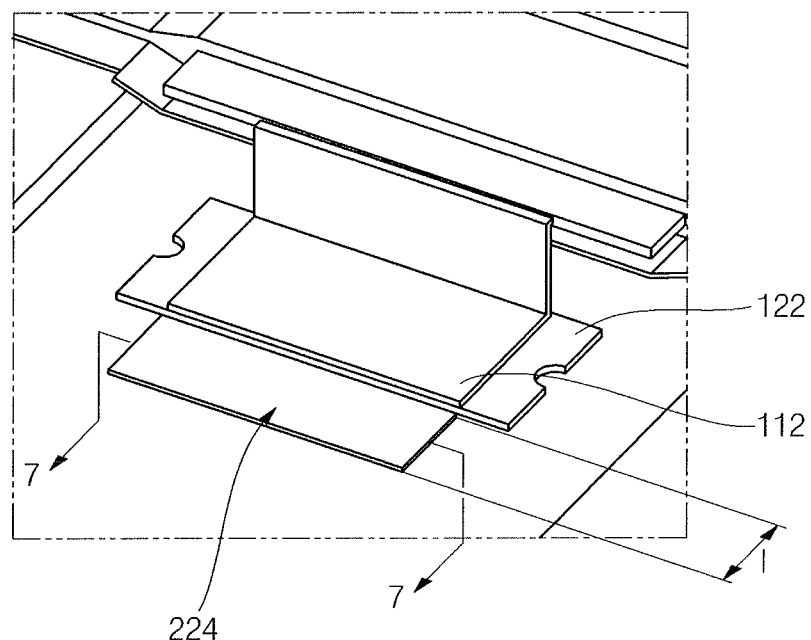
FIG. 6 illustrates an enlarged perspective view of a battery pack according to another embodiment of the present disclosure.
Figure 7A:
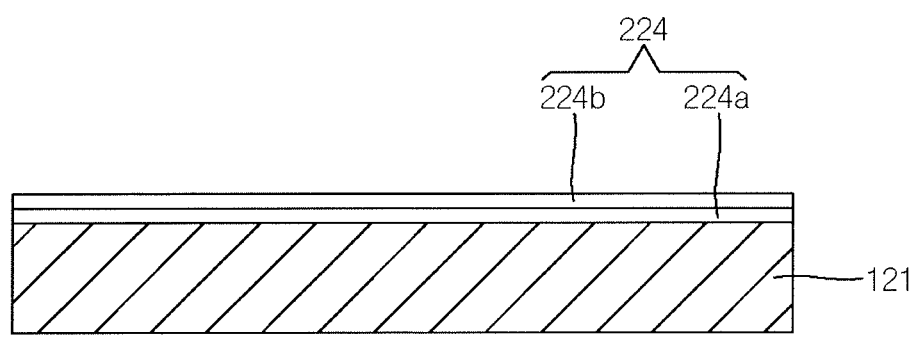
FIGS. 7A and 7B illustrate cross-sectional views taken along the line 7-7 of FIG. 6.
Figure 7B:
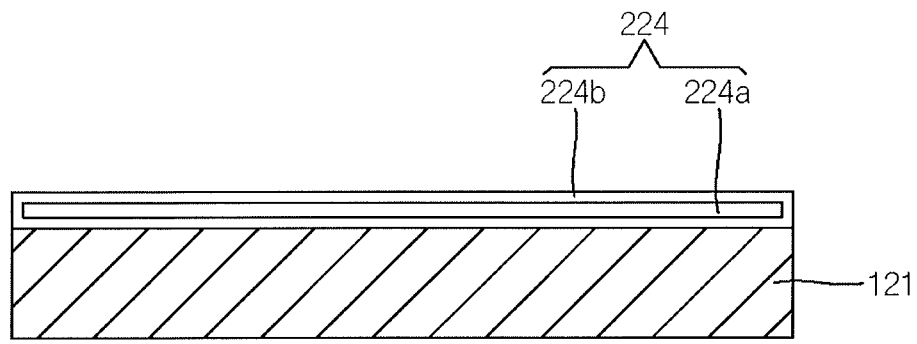

FIG. 6 illustrates an enlarged perspective view of a battery pack according to another embodiment of the present disclosure. FIGS. 7A and 7B illustrate cross-sectional views taken along the line 7-7 of FIG. 6.

The battery pack according to the present embodiment may include a battery cell 110, a protective circuit module 220 electrically connected to the battery cell 110, a frame accommodating the battery cell 110 and the protective circuit module 120, and a cover covering the battery cell 110, the protective circuit module 220, and the frame.

Referring to FIGS. 6, 7A, and 7B, the protective circuit module 220 may include a protection layer 224 further extending from or on a circuit board 121 and a first electrode tab coupling portion 122 on a surface of the circuit board 121 to then be exposed.

The protection layer 224 may include a first layer 224a for protecting the circuit board 121 from laser beams and a second layer 224b covering the first layer 224a.

The first layer 224a may include the same material as the protection layer 124 according to the previous embodiment, e.g., gold, aluminum, iron, platinum, molybdenum. tantalum, chromium, or an alloy thereof.

The second layer 224b may cover at least a top surface of the first layer 224a. For example, the second layer 224b may be on the top surface of the first layer 224a, as shown in FIG. 7A, or the second layer 224b may cover the top and bottom surfaces and side surfaces of the first layer 224a, as shown in FIG. 7B. When the second layer 224b covers at least the top surface of the first layer 224a, welding quality may be visually inspected through the exposed second layer 224b. For example, the second layer 224b may be exposed to an upper portion of the circuit board 121. In an implementation, the second layer 224b may include a material, the color of which varies according to the temperature. For example, when laser beam welding is performed by applying laser beams from upper portions of the first electrode tab 112 and the first electrode tab coupling portion 122, heat from welding may be transferred to the protection layer 224 under the first electrode tab coupling portion 122, thereby changing the color of the second layer 224b of the protection layer 224. In an implementation, an operator may visually inspect whether welding has been stably conducted by identifying a change in the color of the second layer 224b. For example, the laser beam used in the welding may be blocked by the first layer 224a, and welding quality can be observed through the color change of the second layer 224b without a separate process while preventing the circuit board 121 from being damaged, thereby securing an increased operation speed and reliability.

In an implementation, the second layer 224b may include a thermochromic ink, the color of which varies according to welding heat. In an implementation, the thermochromic ink of the second layer 224b may include, e.g., a thermocolor ink, a silk ink or a photo solder resist (PSR) ink. In an implementation, the thermocolor ink may be selected from materials that change their colors at a temperature of the protection layer 224 ranging from 30° C. to 50° C. during laser beam welding.

In an implementation, the thermocolor ink may be a material having a dielectric constant varied with the temperature, consequently undergoing a change in the displayed color, and may generally be referred to a temperature sensing ink or a chameleon ink. In an implementation, the thermocolor ink may have a reversible version or an irreversible version according to whether it reverts back to its original color. The reversible thermocolor ink and irreversible thermocolor ink may be both employed as the second layer 224b. In an implementation, a metallic complex ink, a cholesteric liquid crystal ink, or a metamo color ink may be used as the reversible ink. In an implementation, a telmo color ink may be used as the irreversible thermocolor ink. For example, if the second layer 224b is prepared by coating the thermocolor ink, the operator may determine that the first electrode tab 112 and the first electrode tab coupling portion 122 have been stably welded to each other based on the color change.

In an implementation, the silk ink and the PSR ink, which may used in the manufacture of a PCB, indicate a white colorant and a green colorant, respectively, and have a particle size of less than 50 μm, making it advantageous to fabricate the second layer 224b as a thin film. If the heat applied during laser beam welding is transferred to the silk ink or the PSR ink, a color change may occur. For example, the color change may occur in a temperature range of 30° C. to 50° C. For example, when the second layer 224b is prepared by coating the silk ink or the PSR ink, the color change can be visually observed by the operator, and based on the color change, and the operator may determine whether the welding between the first electrode tab 112 and the first electrode tab coupling portion 122 has been stably conducted.

In an implementation, when the second layer 224b is prepared by coating the thermocolor ink, the operator may also determine based on the color change whether the welding between the first electrode tab 112 and the first electrode tab coupling portion 122 has been stably conducted.

In an implementation, in order to allow the operator to easily observe the color change of the second layer 224b, the protection layer 224 may extend a predetermined length (l) from the first electrode tab coupling portion 122 (e.g., in the Y direction) along the surface of the circuit board 121 to then be exposed.

In an implementation, the extending length (l) of the protection layer 224 may be, e.g., 1 mm to 3 mm. If the extending length (l) of the protection layer 224 is greater than or equal to 1 mm, the protection layer 224 may be exposed (e.g., from or adjacent to the first electrode tab coupling portion 122) even if there is a slight misalignment between the first electrode tab coupling portion 122 and the protection layer 224 during welding, thereby allowing the operator to easily observe welding quality by visual inspection. In addition, if the extending length (l) of the protection layer 224 is less than or equal to 3 mm, the heat generated during laser beam welding may be sufficiently transferred to the protection layer 224, thereby ensuring the color change of the protection layer 224 by exposure to the heat.

In an implementation, the extending length (l) of the protection layer 224 may be, e.g., 1 mm to 2 mm. If the extending length (l) of the protection layer 224 is less than or equal to 2 mm, a color changing effect by the heat derived from laser beams may be enhanced. For example, the operator can more easily determine, by visual inspection, that the welding has been stably conducted.

Hereinafter, a battery pack according to still another embodiment of the present disclosure will be described.

Figure 8:
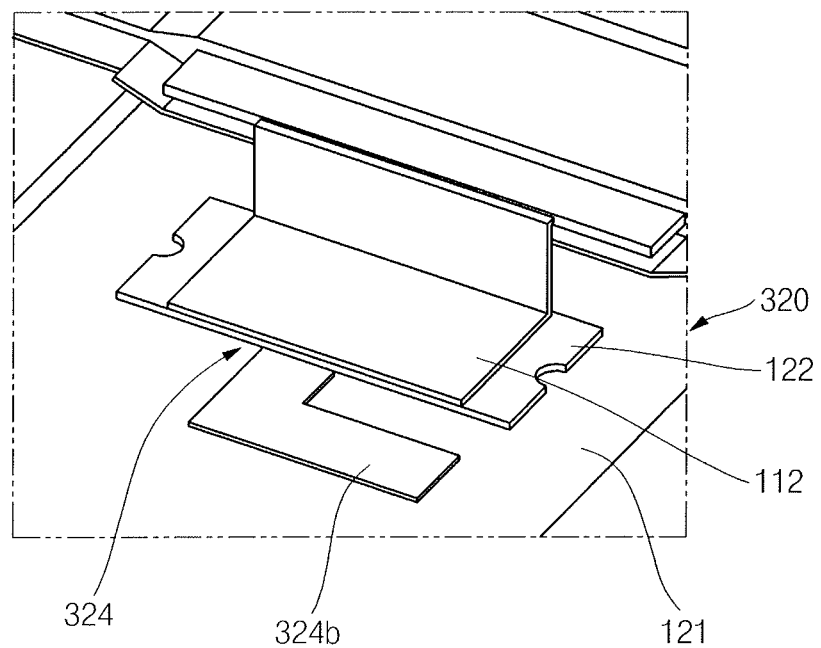
FIG. 8 illustrates an enlarged perspective view of a battery pack according to still another embodiment of the present disclosure.
Figure 9:
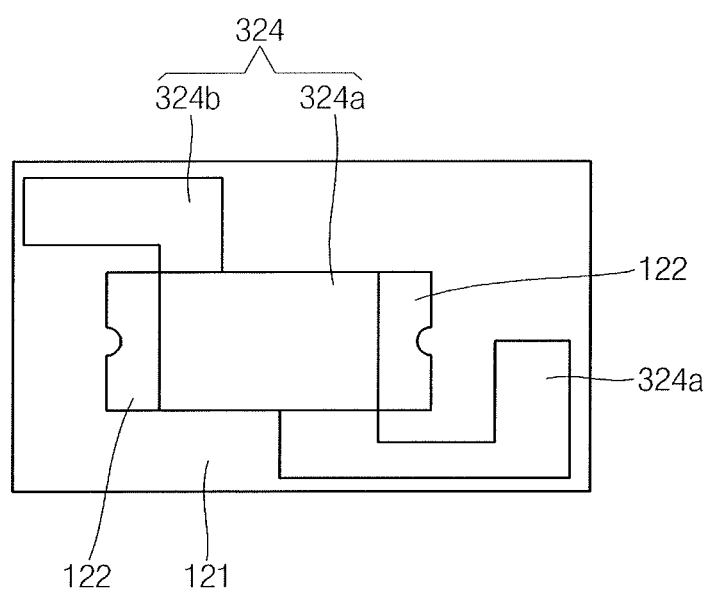
FIG. 9 illustrates a plan view of a conductive pattern provided on a protective circuit module shown in FIG. 8 in a state in which a second electrode tab is not coupled to the protective circuit module.

FIG. 8 illustrates an enlarged perspective view of a battery pack according to still another embodiment of the present disclosure. FIG. 9 illustrates a plan view of a conductive pattern provided on a protective circuit module shown in FIG. 8 in a state in which a second electrode tab is not coupled to the protective circuit module.

The battery pack according to the present embodiment may include a battery cells 110, a protective circuit module 320 electrically connected to the battery cell 110, a frame 130 accommodating the battery cell 110 and the protective circuit module 120, and a cover 140 covering the battery cell 110, the protective circuit module 120, and the frame 130.

Referring to FIGS. 8 and 9, the protective circuit module 320 may include a protection layer 324 and a first electrode tab coupling portion 122 on a surface of the circuit board 121 to then be exposed.

The protection layer 324 may include a first layer 324a for protecting the circuit board 121 from laser beams and a second layer 324b extending from the first layer 324a to be exposed.

The first layer 324a may include the same material as the protection layer 124 according to the previous embodiment, e.g., gold, aluminum, iron, platinum, molybdenum, tantalum, chromium, or an alloy thereof.

The second layer 324b may include a material, the resistance of which varies according to the heat transferred during laser beam welding. In an implementation, the second layer 324b may include the same material as the protection layer 124 or the first layer 324a, e.g., gold, aluminum, iron, platinum, molybdenum, tantalum, chromium, or an alloy thereof. In an implementation, the second layer 324a may include an insulating material, and a PSR ink may be coated on the second layer 324a. As discussed above, the PSR ink, which may used in the manufacture of a PCB, has a particle size of less than 50 μm, making it advantageous to fabricate the second layer 324b as a thin film. In addition, not only the color but also the resistance of the PSR ink may vary according to the heat generated during welding, and the PSR ink may be used in the second layer 324b. In an implementation, the PSR ink may include, e.g., PSR-2000 or PSR-4000 manufactured by Taiyo Ink, Co., Ltd., and R500 Z28 manufactured by Japan OTC.

In an implementation, the second layer 324a may include the same material as the first layer 324a or may include a different material from the first layer 324a.

In an implementation, the second layer 324b may extend from the first layer 324a in at least one direction along the surface of the circuit board 121 to then be exposed. For example, the operator may easily determine whether the welding has been stably conducted by measuring the resistance of the exposed second layer 324b.

One or more embodiments may provide a battery pack in which one can observe welding quality from its appearance while preventing a circuit board from being damaged when laser beam welding is performed in a state in which a protective circuit module and battery cells are mounted on a frame.

One or more embodiments may provide a battery pack in which one can inspect welding quality from its appearance during welding of the electrode tab.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   a protective circuit module including:
      a circuit board extending in a first direction,
      an electrode tab coupling part on the circuit board, and
      a protection layer between the electrode tab coupling part and the circuit board; and
   a battery cell including an electrode tab protruding at one end and having a polarity, the electrode tab being coupled to a top surface of the electrode tab coupling part,
   wherein the electrode tab of the battery cell, the electrode tab coupling part, and the protection layer of the protective circuit module are stacked and coupled in a second direction perpendicular to the first direction.

2. The battery pack as claimed in claim 1, wherein:
   the protective circuit module further includes a solder coupling the electrode tab coupling part to the circuit board, and
   the protection layer has a same height as the solder in the second direction.

3. The battery pack as claimed in claim 1, wherein the electrode tab of the battery cell and the electrode tab coupling part of the protective circuit module are coupled to each other by welding.

4. The battery pack as claimed in claim 1, wherein the protection layer includes gold, aluminum, iron, platinum, molybdenum, tantalum, chromium, or an alloy thereof.

5. The battery pack as claimed in claim 1, wherein the protection layer includes:
   a first layer positioned between the electrode tab coupling part and the circuit board, and
   a second layer extending from the first layer along a surface of the circuit board in the first direction.

6. The battery pack as claimed in claim 5, wherein a surface of the second layer includes a thermocolor ink, a silk ink, or a photo solder resist ink.

7. The battery pack as claimed in claim 5, wherein the second layer is exposed on the circuit board.

8. The battery pack as claimed in claim 5, wherein the second layer extends a distance of 2 mm or less outwardly from under the electrode tab coupling part.

9. The battery pack as claimed in claim 1, wherein the protection layer has an area corresponding to at least the electrode tab.

* * * * *